(12) United States Patent
Watanabe et al.

(10) Patent No.: US 6,812,984 B2
(45) Date of Patent: Nov. 2, 2004

(54) LIQUID CRYSTAL DISPLAY APPARATUS WITH ADDRESS MARKS CONNECTED TO CONNECTIONS

(75) Inventors: Makoto Watanabe, Tokyo (JP); Syunsuke Shiga, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 62 days.

(21) Appl. No.: 10/098,681

(22) Filed: Mar. 14, 2002

(65) Prior Publication Data

US 2002/0131004 A1 Sep. 19, 2002

(30) Foreign Application Priority Data

Mar. 14, 2001 (JP) ........................................ 2001-072536

(51) Int. Cl.[7] .............................................. G02F 1/1343
(52) U.S. Cl. ........................................ 349/139; 349/192
(58) Field of Search ................................. 349/139, 141, 349/143, 192, 149, 39; 257/59, 770

(56) References Cited

U.S. PATENT DOCUMENTS 5,760,421 A * 6/1998 Takahashi et al. ............ 257/59
6,512,565 B1 * 1/2003 Lee et al. .................... 349/130
6,597,427 B1 * 7/2003 Katsu et al. ................. 349/192

FOREIGN PATENT DOCUMENTS

| JP | 2000147538 A | * 5/2000 | ......... G02F/1/1343 |
| JP | 2000-147549 | 5/2000 | |
| JP | 2000147549 A | * 5/2000 | ........... G02F/1/136 |

* cited by examiner

Primary Examiner—Robert H. Kim
Assistant Examiner—David Chung
(74) Attorney, Agent, or Firm—Dickstein, Shapiro, Morin & Oshinsky, LLP.

(57) ABSTRACT

In a liquid crystal display apparatus including a transparent substrate, a plurality of first bus lines formed on the transparent substrate, a plurality of second bus lines formed on the transparent substrate substantially perpendicular to the first bus lines, a plurality of common electrode lines formed on the transparent substrate in parallel with the first bus lines, and a plurality of pixels each connected to one of the first bus lines, one of the second bus lines and one of the common electrode lines, a plurality of address marks are formed on the transparent substrate and each of the address marks is connected to one of the first bus lines, the second bus lines and the common electrode lines.

16 Claims, 11 Drawing Sheets

LIQUID CRYSTAL DISPLAY APPARATUS WITH ADDRESS MARKS CONNECTED TO CONNECTIONS

BACKGROUND OF THE INVENTION

1. Field of the Invention

The present invention relates to a liquid crystal display (LCD) apparatus, and more particularly, to the improvement of address marks for easily specifying a defective location in the LCD apparatus.

2. Description of the Related Art

Generally, a prior art LCD apparatus is constructed by a transparent substrate, a plurality of gate bus lines formed on the transparent substrate, a plurality of signal bus lines formed on the transparent substrate substantially perpendicular to the gate bus lines, a plurality of common electrode lines formed on the transparent substrate in parallel with the gate bus lines, and a plurality of pixels connected to one of the gate bus lines, one of the signal bus lines and one of the common electrode lines.

During an inspection mode, in order to easily specify a defective location, a plurality of address marks are provided for the gate bus lines (the common electrode lines) and the signal bus lines (see JP-A-2000-147549). This will be explained later in detail.

In the above-described prior art LCD apparatus, however, there are the following problems. First, when a static charge is transferred by means of a spark or the like to one address mark, since the address mark is electrically isolated, the static charge is consumed as Joule heat therein, so that the address mark is melted, which would generate defects by dust. Second, if each of the address marks serves as a test pad so that the address marks are exposed to the air, when a rubbing process using a rubbing roller is performed upon the address marks, the address marks are peeled off, which also would generate defects by dust.

SUMMARY OF THE INVENTION

It is an object of the present invention to provide an LCD apparatus with address marks capable of avoiding defects by dust.

According to the present invention, in an LCD apparatus including a transparent substrate, a plurality of first bus lines formed on the transparent substrate, a plurality of second bus lines formed on the transparent substrate substantially perpendicular to the first bus lines, a plurality of common electrode lines formed on the transparent substrate in parallel with the first bus lines, and a plurality of pixels each connected to one of the first bus lines, one of the second bus lines and one of the common electrode lines, a plurality of address marks are formed on the transparent substrate and each of the address marks is connected to one of the first bus lines, the second bus lines and the common electrode lines. Thus, since each of the address marks is connected to one of the bus lines and the common electrode lines, even if a static charge is transferred to one of the address marks, the static charge is transferred to the bus lines or the common electrode lines, which would avoid defects by dust.

Also, the address marks are covered by an insulating layer. Thus, even if a rubbing process is performed upon the address marks, the address marks are hardly peeled off, which also would avoid defects by dust.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art LCD apparatus will be explained with reference to FIGS. 1, 2, 3, 4, 5 and 6.

Figure 1:
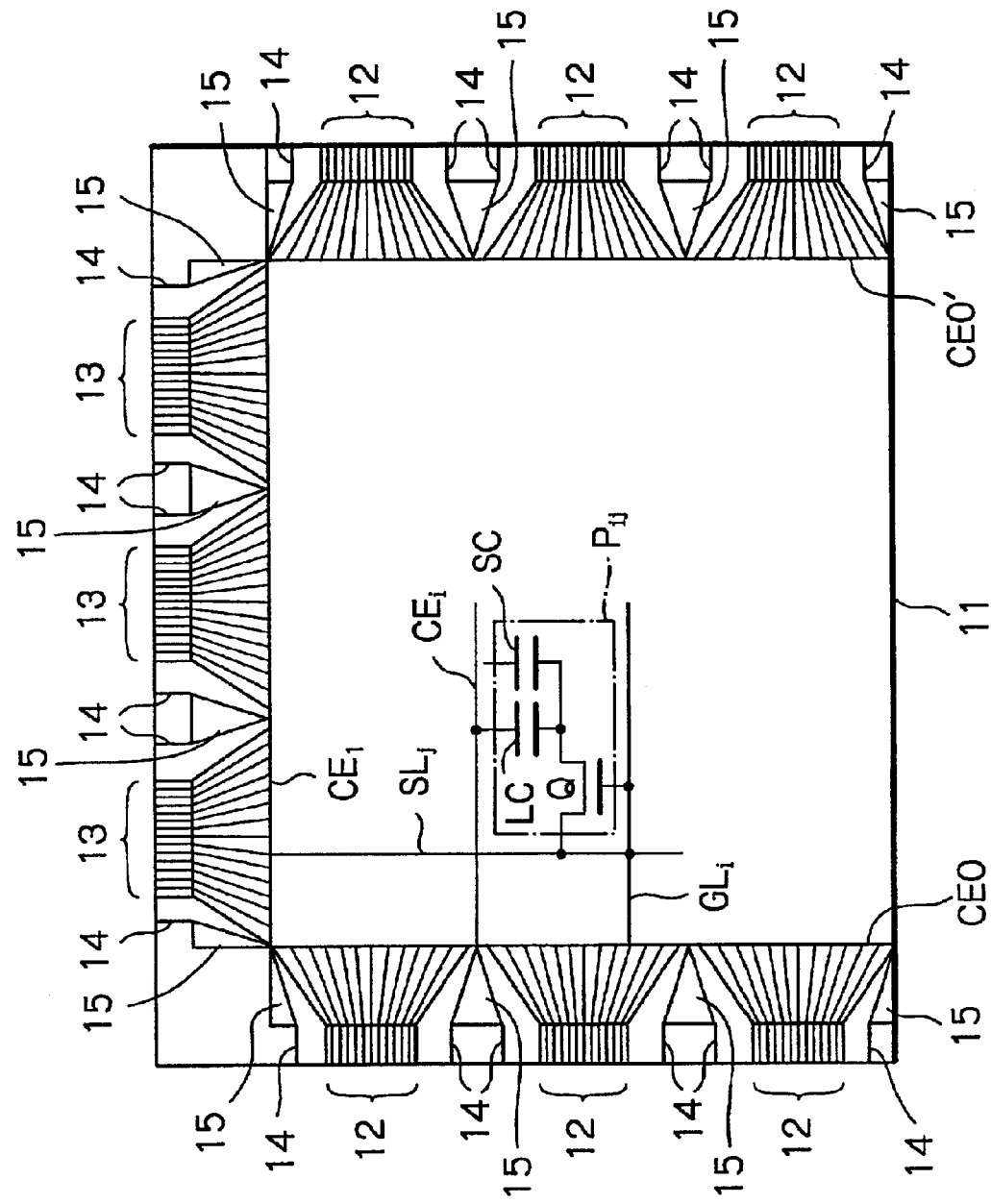
FIG. 1 is a plan view illustrating a prior art LCD apparatus.

In FIG. 1, which is a plan view illustrating a prior art LCD apparatus, a gate bus line $GL_i$ (i=1, 2, ..., m) and a signal bus lines $SL_j$ (j=1, 2, ..., n) are provided on a transparent substrate 11, and a pixel $P_{ij}$ is provided at an intersection between the gate bus line $GL_i$ and the signal bus line $SL_j$. Also, the pixel $P_{ij}$ is constructed by a thin film transistor (TFT) Q, a liquid crystal cell LC and a storage capacitor SC. In this case, the liquid crystal cell LC is connected to a common electrode line $CE_i$ arranged in parallel with the gate bus line $GL_i$. Also, the storage capacitor SC is connected to an adjacent gate line in a gate storage type or a storage line (not shown) in a storage capacitor type, thereby substantially increasing the capacitance of the liquid crystal cell LC.

Also, gate (scan) terminals 12 are provided on the transparent substrate 11 and one of the scan terminals 12 is connected to the gate bus line $GL_i$. Similarly, signal terminals 13 are provided on the transparent substrate 11 and one of the signal terminals 13 is connected to the signal bus line $SL_j$.

Further, common terminals 14 and terminal blocks 15 are provided and are connected to the common electrode line $CE_i$. The common electrode line $CE_i$ is connected to two main common electrode lines CE0 and CE0' which are connected via the terminal blocks 15 to the common terminals 14. Note that FIG. 2 illustrates a partial circuit diagram of the LCD apparatus of FIG. 1 around the main common electrode line CE0.

Figure 2:
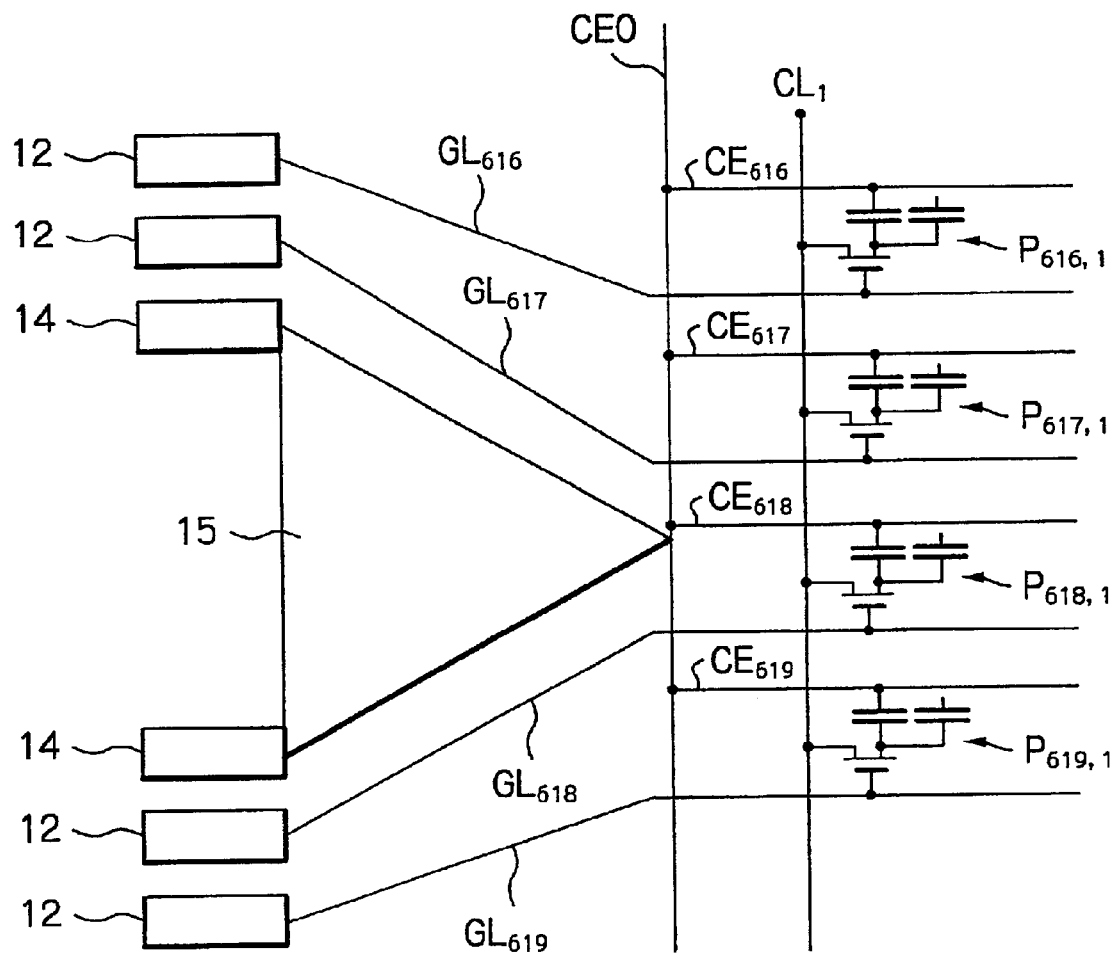
FIG. 2 is a partial circuit diagram of the LCD apparatus of FIG. 1.
Figure 3:
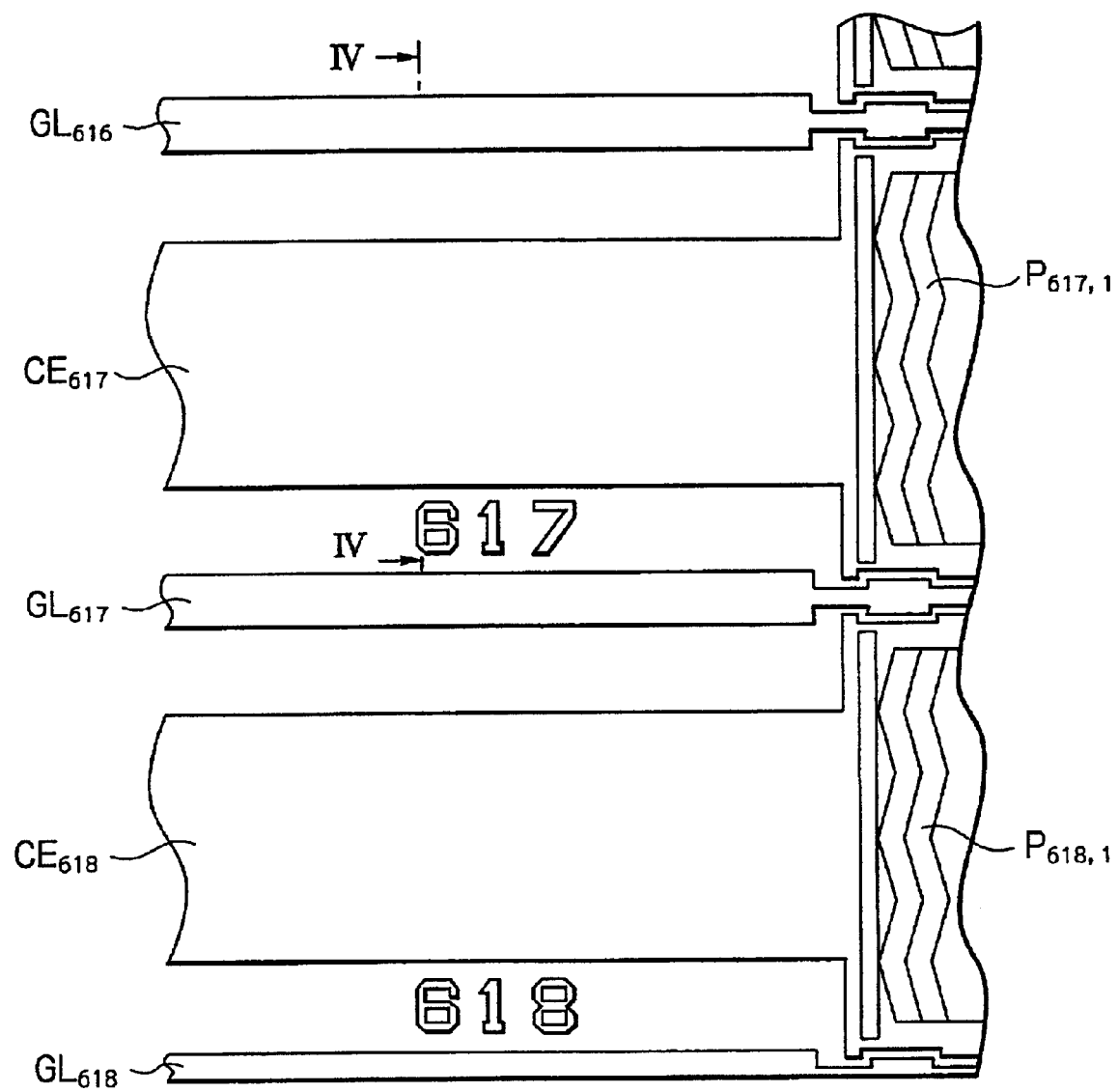
FIG. 3 is a plan view of the address marks of FIG. 2.

In the LCD apparatus of FIGS. 1 and 2, in order to easily specify a defective location, an address mark is provided for the gate bus line $GL_i$ and the common electrode line $CE_i$ (i=1, 2, ..., m) as illustrated in FIG. 3 (see FIG. 3 of JP-A-2000-147549). For example, a scan address mark "617" is provided for the gate bus line $GL_{617}$ and the common electrode line $CE_{617}$, and a scan address mark "618" is provided for the gate bus line $GL_{618}$ and the common electrode line $CE_{618}$.

Figure 4:
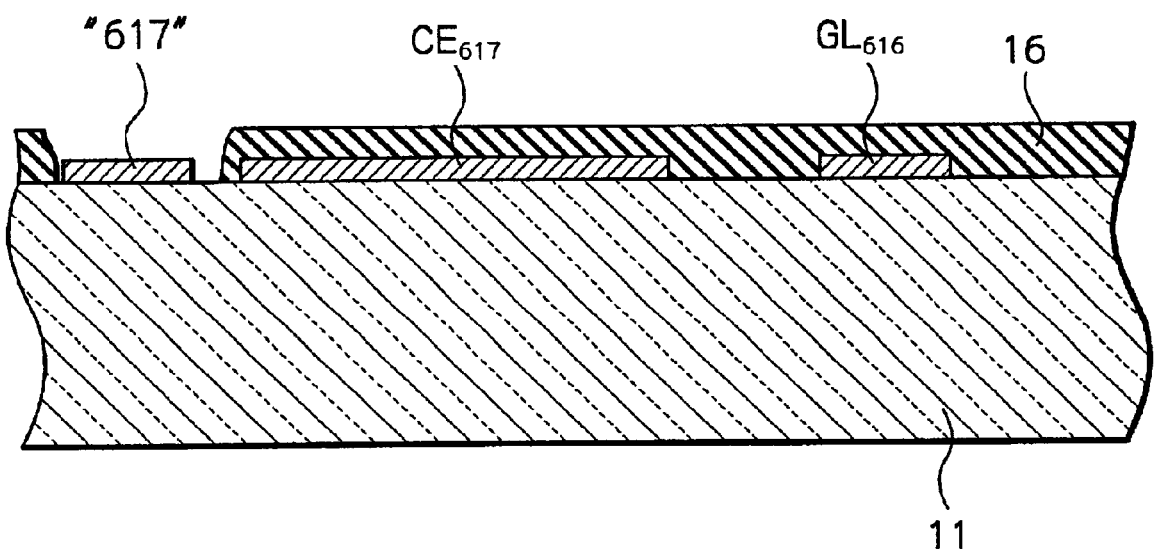
FIG. 4 is a cross-sectional view taken along the line IV—IV of FIG. 3.

As illustrated in FIG. 4, the address marks "617", "618", ... are made of the same material of the common electrode lines $CE_i$ (i=1, 2, . . . , m). For example, this material is Cr, Al or Mo. In this case, if each of the address marks serves as a test pad, although the gate bus line $GL_i$ and the common electrode line $CE_i$ are covered by an insulating layer 16 made of silicon oxide or silicon nitride, the address marks are exposed to the air.

Figure 5:
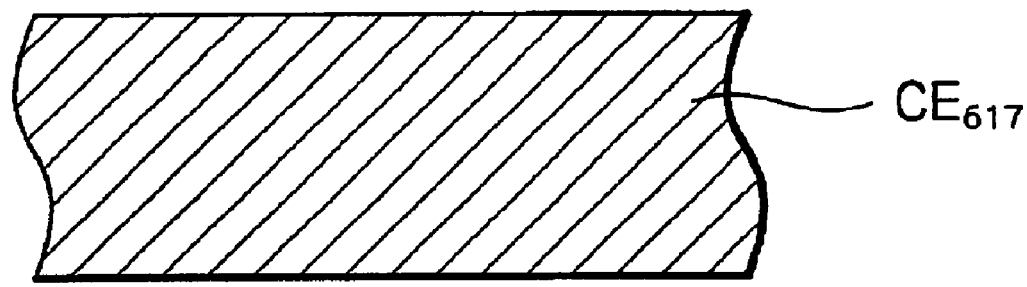
FIG. 5 is a plan view for explaining a problem in the address marks of FIG. 3.
Figure 5:
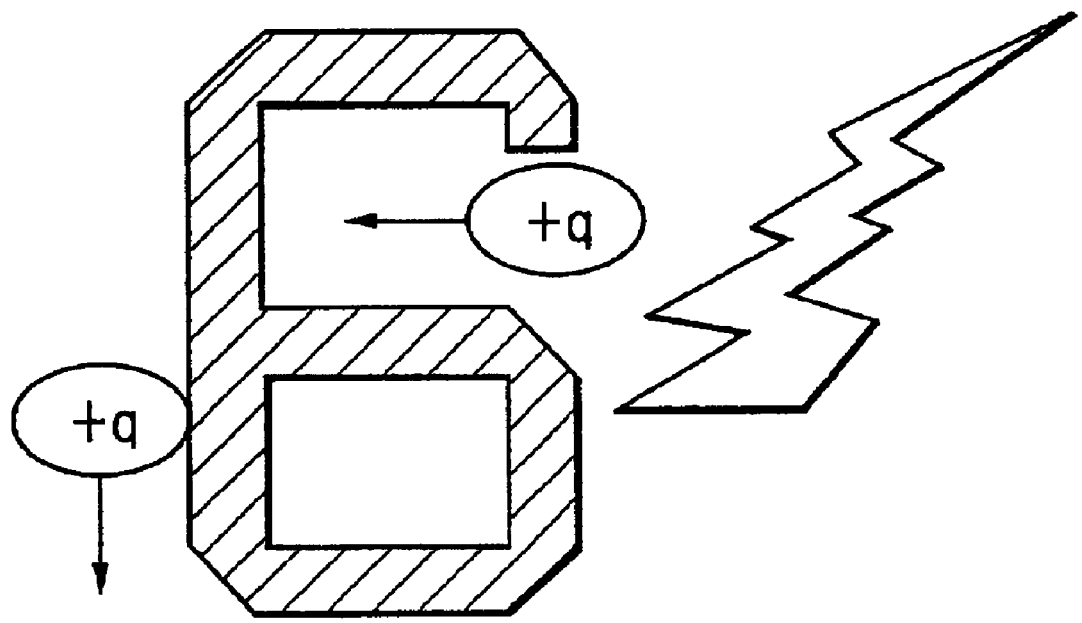
Figure 6:
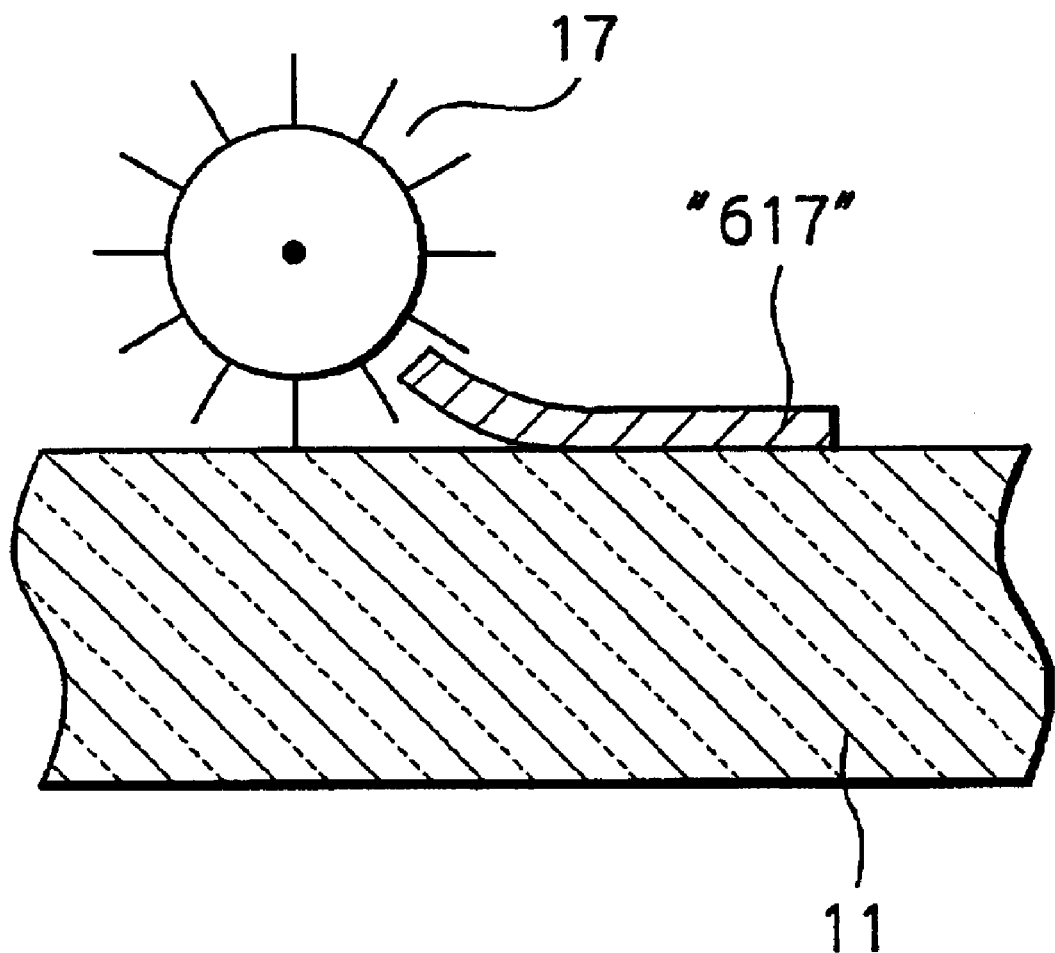
FIG. 6 is a cross-sectional view for explaining another problem in the address marks of FIG. 3.

The address marks of FIGS. 3 and 4 have the following problems. First, as illustrated in FIG. 5, when a static charge +q is transferred by means of a spark or the like to one address mark, the static charge +q is consumed as Joule heat therein, so that the address mark is melted, which would generate defects by dust. Second, if each of the address marks serves as a test pad so that the address marks are exposed to the air, as illustrated in FIG. 6, when a rubbing process using a rubbing roler 17 is performed upon the address marks, the address marks are peeled off, which also would generate defects by dust.

Figure 7:
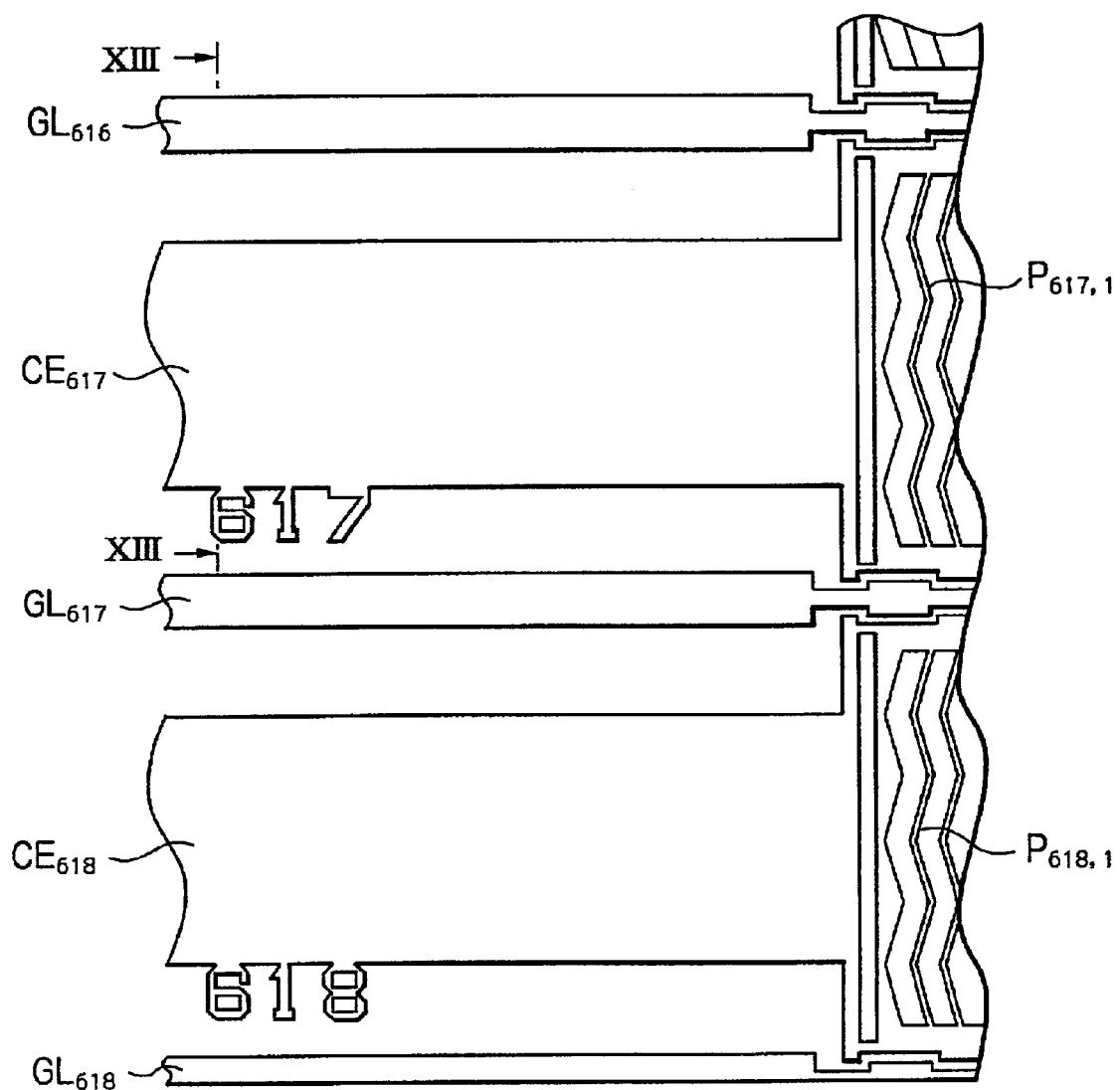
FIG. 7 is a plan view illustrating a first embodiment of the LCD apparatus according to the present invention.

In FIG. 7, which illustrates a first embodiment of the LCD apparatus according to the present invention, an address mark provided for the gate bus line $GL_i$ and the common electrode line $CE_i$(i=1, 2, . . . , m) is connected to the common electrode line $CE_i$(i=1, 2, . . . , m). For example, a scan address mark "617" is connected to the common electrode line $CE_{617}$, and a scan address mark "618" is connected to the common electrode line $CE_{618}$.

Figure 8:
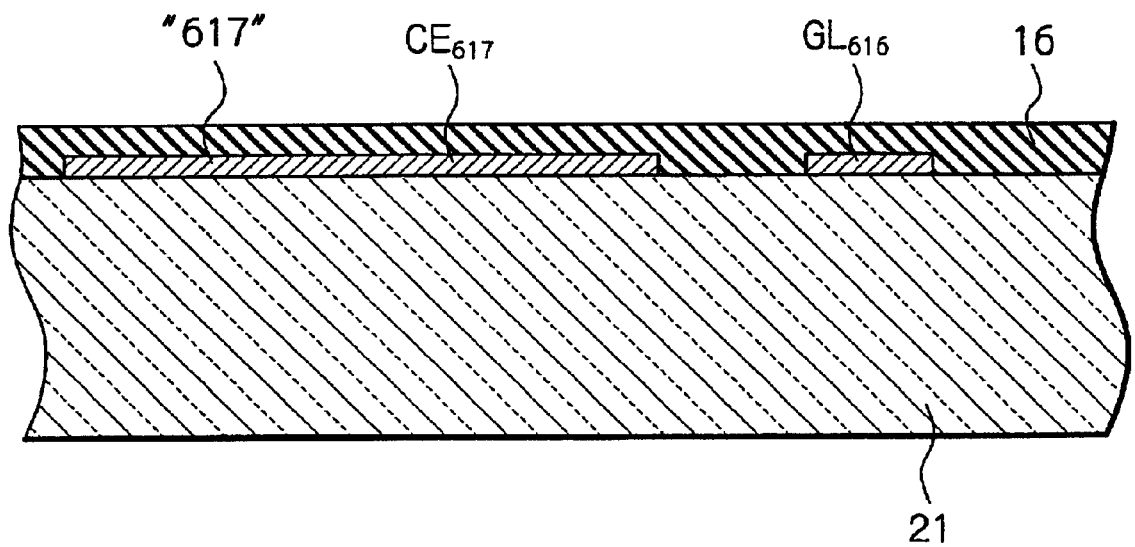
FIG. 8 is a cross-sectional view taken along the line VIII—VIII of FIG. 7.

As illustrated in FIG. 8, the address marks "617", "618", . . . are made of the same material as the common electrode lines $CE_i$ (i=1, 2, . . . , m). For example, this material is Cr, Al or Mo. In this case, the address marks as well as the gate bus line $GL_i$ and the common electrode line $CE_i$ are covered by an insulating layer 16 made of silicon oxide or silicon nitride, so that the address marks are not exposed to the air.

Figure 9:
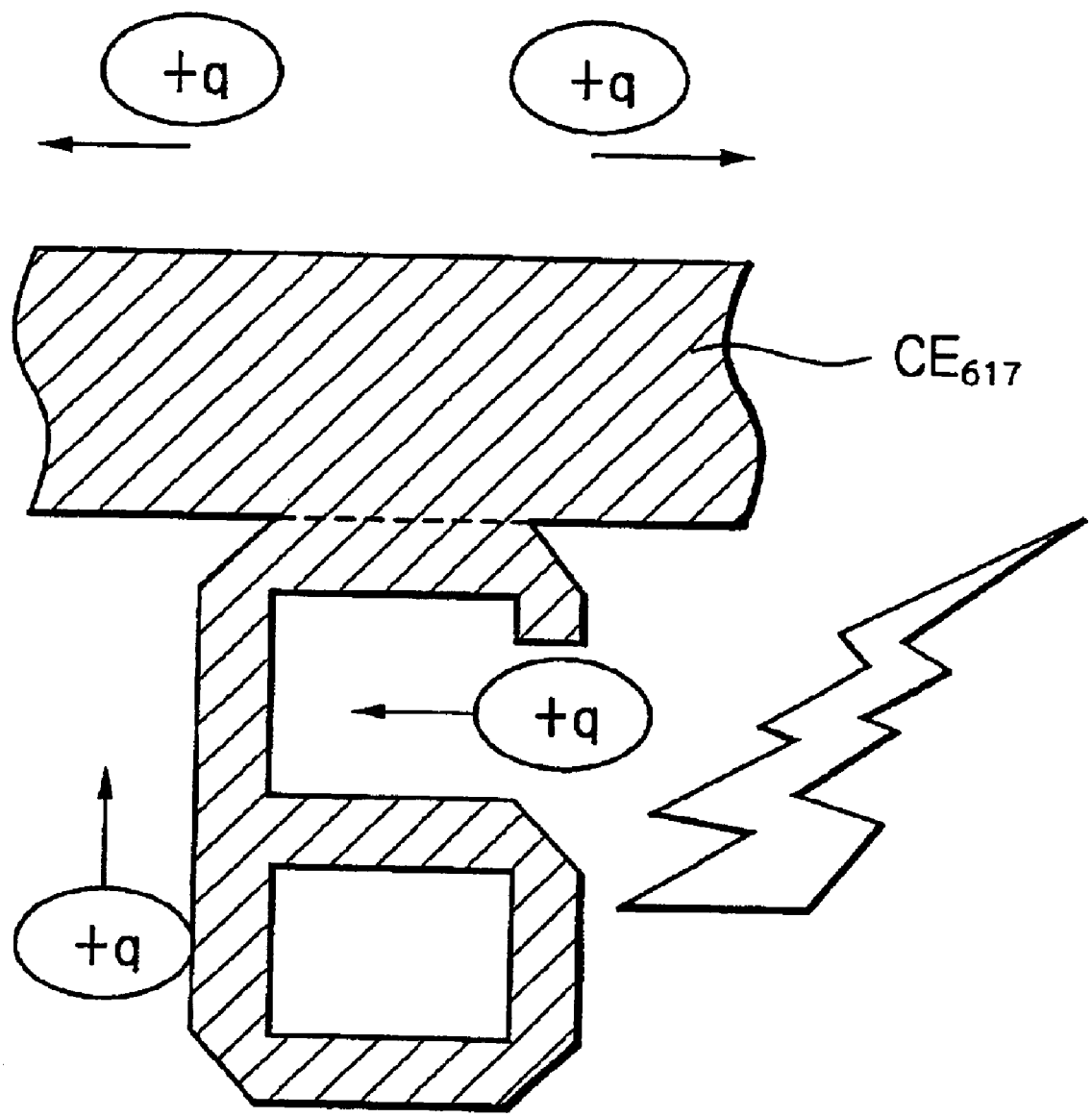
FIG. 9 is a plan view for explaining an effect in the address marks of FIG. 7.
Figure 10:
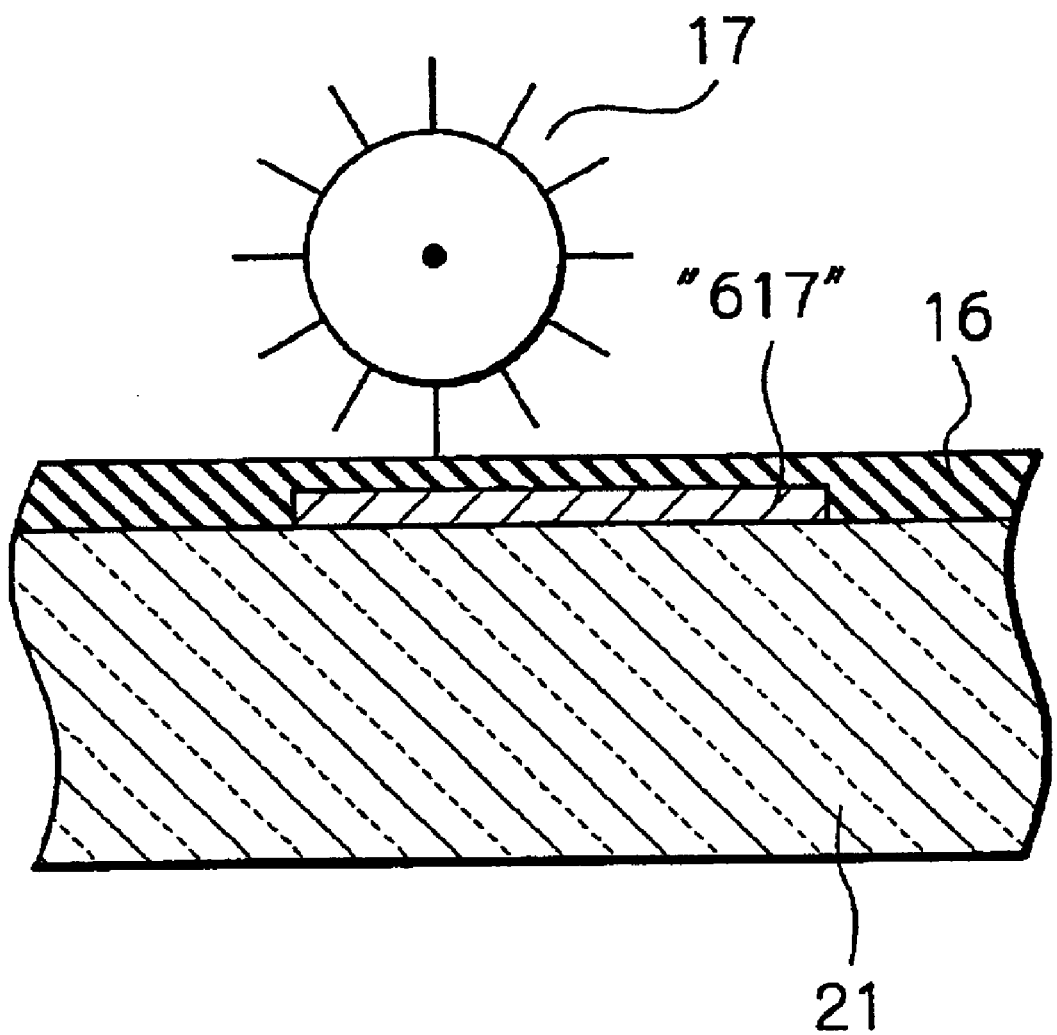
FIG. 10 is a cross-sectional view for explaining another effect in the address marks of FIG. 7.

The address marks of FIGS. 7 and 8 have the following effects. First, as illustrated in FIG. 9, when a static charge +q is transferred by means of a spark or the like to one address mark, the static charge +q is transferred to the common electrode line $CE_{617}$, so that the address mark is not melted, which would not generate defects by dust. Second, since the address marks are not exposed to the air, as illustrated in FIG. 10, when a rubbing process using a rubbing roller 17 is carried out, the address marks are hardly peeled off due to the presence of the insulating layer 17, which would not generate defects by dust.

Figure 11:
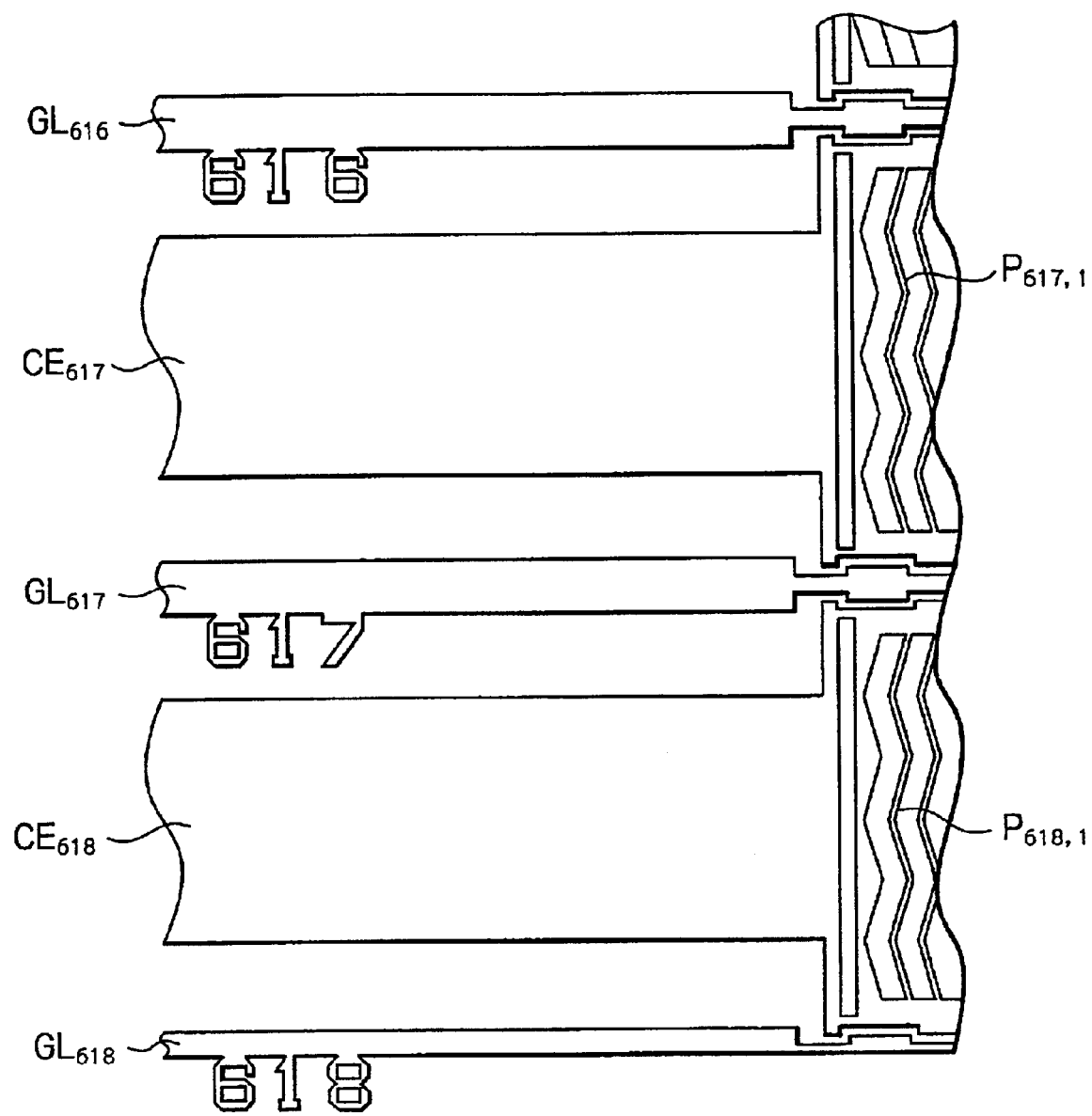
FIG. 11 is a plan view illustrating a second embodiment of the LCD apparatus according to the present invention.

In FIG. 11, which illustrates a second embodiment of the LCD apparatus according to the present invention, an address mark provided for the gate bus line $GL_i$ and the common electrode line $CE_i$(i=1, 2, . . . , m) is connected to the gate bus line $GL_i$(i=1, 2, . . . , m). For example, a scan address mark "617" is connected to the gate bus line $GL_{617}$, and a scan address mark "618" is connected to the gate bus line $GE_{618}$.

In the second embodiment, the same effects as in the first embodiment can be expected.

In the above-described embodiments, although one address mark is provided for the gate bus line $GL_i$ and the common electrode line $CE_i$, one address mark can be provided for the signal bus line $SL_j$.

Also in the above-described embodiments, although the address marks are constructed by numerals, the address marks can be constructed by letters or combinations of numerals and letters.

As explained hereinabove, according to the present invention, defects by dust can be avoided.

What is claimed is:

1. A liquid crystal display apparatus comprising:
   a transparent substrate;
   a plurality of first bus lines formed on said transparent substrate;
   a plurality of second bus lines formed on said transparent substrate substantially perpendicular to said first bus lines;
   a plurality of common electrode lines formed on said transparent substrate in parallel with said first bus lines;
   a plurality of pixels each connected to one of said first bus lines, one of said second bus lines and one of said common electrode lines; and
   a plurality of address marks formed on said transparent substrate, each of said address marks being adjacent to and connected to one of said first bus lines, said second bus lines and said common electrode lines.

2. The apparatus set forth in claim 1, wherein each of said address marks is provided at an end of said one of said first bus lines, said second bus lines and said common electrode lines.

3. The apparatus as set forth in claim 1, further comprising an insulating layer for covering said address marks.

4. The apparatus as set forth in claim 1, wherein said address marks comprise the same material as said one of said first bus lines, said second bus lines and said common electrode lines.

5. A liquid crystal display apparatus comprising:
   a transparent substrate;
   a plurality of gate bus lines formed on said transparent substrate;
   a plurality of signal bus lines formed on said transparent substrate substantially perpendicular to said gate bus lines;
   a plurality of common electrode lines formed on said transparent substrate in parallel with said gate bus lines;
   a plurality of pixels each connected to one of said gate bus lines, one of said signal bus lines and one of said common electrode lines; and
   a plurality of address marks formed on said transparent substrate, each of said address marks being adjacent to and connected to one of said gate bus lines.

6. The apparatus as set forth in claim 5, wherein each of said address marks is provided at an end of said one of said gate bus lines.

7. The apparatus as set forth in claim 5, further comprising an insulating layer for covering said address marks.

8. The apparatus as set forth in claim 5, wherein said address marks comprise the same material as said gate bus lines.

9. A liquid crystal display apparatus comprising:
   a transparent substrate;
   a plurality of gate bus lines formed on said transparent substrate;
   a plurality of signal bus lines formed on said transparent substrate substantially perpendicular to said gate bus lines;
   a plurality of common electrode lines formed on said transparent substrate in parallel with said gate bus lines;
   a plurality of pixels each connected to one of said gate bus lines, one of said signal bus lines and one of said common electrode lines; and
   a plurality of address marks formed on said transparent substrate, each of said address marks being adjacent to and connected to one of said signal bus lines.

10. The apparatus as set forth in claim 9, wherein each of said address marks is provided at an end of said one of said signal bus lines.

11. The apparatus as set forth in claim 9, further comprising an insulating layer for covering said address marks.

12. The apparatus as set forth in claim 9, wherein said address marks comprise the same material as said signal bus lines.

13. A liquid crystal display apparatus comprising:

a transparent substrate;

a plurality of gate bus lines formed on said transparent substrate;

a plurality of signal bus lines formed on said transparent substrate substantially perpendicular to said gate bus lines;

a plurality of common electrode lines formed on said transparent substrate in parallel with said gate bus lines;

a plurality of pixels each connected to one of said gate bus lines, one of said signal bus lines and one of said common electrode lines; and a plurality of address marks formed on said transparent substrate, each of said address marks being adjacent to and connected to one of said common electrode lines.

14. The apparatus as set forth in claim 13, wherein each of said address marks is provided at an end of said one of said common electrode lines.

15. The apparatus as set forth in claim 13, further comprising an insulating layer for covering said address marks.

16. The apparatus as set forth in claim 13, wherein said address marks comprise the same material as said common electrode lines.

* * * * *